US007089320B1

(12) United States Patent
Biederman et al.

(10) Patent No.: US 7,089,320 B1
(45) Date of Patent: Aug. 8, 2006

(54) APPARATUS AND METHODS FOR COMBINING DATA

(75) Inventors: Daniel C. Biederman, San Jose, CA (US); Vivian W. Chiang, Mountain View, CA (US); Jeffrey P. Chou, Foster City, CA (US); Malathy Sethuraman, San Jose, CA (US); Constantine P. Sapuntzakis, Stanford, CA (US)

(73) Assignee: Cisco Technology, Inc., San Jose, CA (US)

( * ) Notice: Subject to any disclaimer, the term of this patent is extended or adjusted under 35 U.S.C. 154(b) by 655 days.

(21) Appl. No.: 09/872,989

(22) Filed: Jun. 1, 2001

(51) Int. Cl.
*G06F 15/16* (2006.01)

(52) U.S. Cl. .................... 709/234; 709/231; 709/232; 709/236; 709/238

(58) Field of Classification Search ................ 709/233, 709/234, 236, 238, 232, 203, 213, 230–239; 370/389, 395.21, 400, 470, 471, 473, 474
See application file for complete search history.

(56) References Cited

U.S. PATENT DOCUMENTS

| 5,359,593 | A | | 10/1994 | Derby et al. ................ 370/17 |
|---|---|---|---|---|
| 5,396,490 | A | * | 3/1995 | White et al. ................ 370/474 |
| 5,440,545 | A | * | 8/1995 | Buchholz et al. ........... 370/474 |
| 5,754,768 | A | * | 5/1998 | Brech et al. ................ 709/236 |
| 5,784,554 | A | | 7/1998 | Hsiung ................... 395/183.21 |
| 5,808,952 | A | | 9/1998 | Fung et al. ................ 365/222 |
| 5,815,492 | A | | 9/1998 | Berthaud et al. ........... 370/234 |
| 5,937,169 | A | | 8/1999 | Connery et al. ........... 395/200.8 |
| 5,941,988 | A | | 8/1999 | Bhagwat et al. ............ 713/201 |
| 6,003,089 | A | * | 12/1999 | Shaffer et al. .............. 709/234 |
| 6,006,264 | A | | 12/1999 | Colby et al. ................ 709/226 |
| 6,011,776 | A | | 1/2000 | Berthaud et al. ........... 370/234 |
| 6,016,315 | A | * | 1/2000 | Chambers et al. .......... 370/391 |
| 6,018,530 | A | | 1/2000 | Chakravorty ............... 370/471 |
| 6,038,216 | A | | 3/2000 | Packer ....................... 370/231 |
| 6,118,791 | A | | 9/2000 | Fichou et al. .............. 370/468 |
| 6,212,190 | B1 | * | 4/2001 | Mulligan .................... 370/400 |
| 6,246,684 | B1 | * | 6/2001 | Chapman et al. ........... 370/394 |
| 6,341,129 | B1 | * | 1/2002 | Schroeder et al. .......... 370/389 |

(Continued)

FOREIGN PATENT DOCUMENTS

GB          2352357 A   *   1/2001

OTHER PUBLICATIONS

Tounsi, H et al, "Small Packets Aggregation in an IP Domain", 2001, Sixth IEEE Symposium on Computers and Communications, 2001. Proceedings., pp. 708-713.*

(Continued)

*Primary Examiner*—Ario Etienne
*Assistant Examiner*—Ramy M. Osman
(74) *Attorney, Agent, or Firm*—Beyer Weaver & Thomas, LLP

(57) ABSTRACT

Disclosed are methods and apparatus for combining data segments. At a combiner node, data segments are received from a first node that are destined for a second node. At the combiner node, the received data segments are combined and buffered with previously buffered data segments from the first node if present until a first condition is met. At the combiner node, at least a portion of the combined data segments are sent to the second node when the first condition is met. The received data segments are combined in the combiner node prior to being sent to the second node so as to reduce processing and/or storage resources consumed by the second node.

41 Claims, 13 Drawing Sheets

U.S. PATENT DOCUMENTS

| | | | |
|---|---|---|---|
| 6,609,157 B1* | 8/2003 | Deo et al. ................... | 709/247 |
| 6,614,808 B1* | 9/2003 | Gopalakrishna ............ | 370/474 |
| 6,636,859 B1* | 10/2003 | Banerjee ..................... | 709/236 |
| 6,643,259 B1* | 11/2003 | Borella et al. ......... | 370/395.21 |
| 6,714,985 B1* | 3/2004 | Malagrino et al. .......... | 709/236 |
| 6,721,334 B1* | 4/2004 | Ketcham .................... | 370/473 |
| 6,742,045 B1* | 5/2004 | Jordan et al. ............... | 709/238 |
| 6,847,643 B1* | 1/2005 | Nie ............................ | 370/391 |
| 6,886,040 B1* | 4/2005 | Fitzgerald ................... | 709/233 |
| 6,889,249 B1* | 5/2005 | Miloushev et al. ......... | 709/213 |
| 6,996,059 B1* | 2/2006 | Tonogai ...................... | 370/230 |

OTHER PUBLICATIONS

Anirban Mahanti, Traffic Analysis of a Web Proxy Caching Hierarchy', IEEE Network-May.Jun. 2000.

Daedalus Research Group, University of California at Berkeley, "The Berkeley Snoop Protocol", www.cs.berkeley.edu/~hari/papers/snoop.html, printed Jun. 13, 2001.

Bakre, Ajay and B.R. Badrinath, "I-TCP: Indirect TCP forn Mobile Hosts", www.cs.berkeley.edu:80/~gribble/summaries/wireless/itcp.html, printed Jun. 13, 2001.

Bakre, Ajay and B.R. Badrinath, "I-TCP: Indirect TCP for Mobile Hosts", Department of Computer Science, Rutgers University, Piscataway, NJ 08855. DCS-TR-314, Oct. 1994.

Leach, et al., "SOCKS Protocol Version 5", RFC 1928. Mar. 1996.

B.R. Badrinath and Pradeep Sudame, "Gathercast: An efficient Multi-Point to Point Aggregation Mechanism in IP Networks". Department of Computer Science Rutgers University, Piscataway, NJ 08855. Jul. 1998.

B.R. Badrinath and Pradeep Sudame, "Gathercast: The Design and Implementation of a Programmable Aggregation Mechanism for the Internet", Department of Computer Science, Rutgers Univeristy.

* cited by examiner

APPARATUS AND METHODS FOR COMBINING DATA

BACKGROUND OF THE INVENTION

The present invention relates to methods and apparatus for handling data at an intermediary computer. More specifically, this invention pertains to off-loading packet handling from a receiving or transmitting computer to the intermediary computer.

In TCP one of the parameters that limits packet transmission is the maximum segment size (MSS) of the packet through a computer network. The MSS is usually advertised between a client and a server, but may also be dictated by the network itself. That is, the packet size may be limited by the maximum transmission unit (MTU) of the network between the client and the server. As a result of these limits to the packet size, the client will typically send small data segments to meet these size requirements to the server.

When small segments are sent by a client within a computer network, the client TCP software allocates buffer space, forms a segment header, and computes a checksum for each segment. Additionally, client IP software encapsulates the segment in a datagram, computes a header checksum, and routes the datagram to the receiver software. The server IP software verifies the IP header checksum, and passes the segment to TCP software which then verifies the segment checksum, examines the sequence number, extracts the data, and places it within a buffer. Accordingly, smaller sized data packets or segments require significantly more processing resources by the receiving node (e.g., the server), as well as the client than larger sized packets.

Accordingly, there is a need for mechanisms for decreasing the processing load at a receiving or server processing node while meeting the network requirements for packets size between the sending processing node and the receiving processing node. Additionally, there is a need for reducing the load on such node when it is sending packets, as well as receiving them.

SUMMARY OF THE INVENTION

Accordingly, the present invention provides methods and apparatus for off-loading the processing load from a receiving node to an intermediary device through which packets are transmitted from a sender node to the receiving node. In general terms, the intermediary device is configured relative to the receiving node such that the packet size requirements are significantly less than for the network between the sending node and the receiving node. For example, the intermediary device is located relatively close to the receiving node with few other devices being present between the intermediary device and the receiving node. For example, in TCP the maximum segment size (MSS) and maximum transmission unit (MTU) between the intermediary device and the receiving node are much higher than the MSS and MTU between the sending node and the intermediary device. Since the packet size requirements are increased for packets sent between the intermediary node and the receiving node, the intermediary node is able to provides mechanisms for combining smaller sized packets sent by a sending node to a receiving node. The intermediary device then sends the larger sized combined packets to the receiving node. The receiving node then receives larger more manageable packets. In other embodiments, other processes that are off-loaded from the server include combining data fragments, reordering data segments, combining data segments based on priority, content of such data segments, or congestion, and splitting large packets sent from the server to a client In one embodiment, a method for combining data segments is disclosed. At a combiner node, data segments are received from a first node that are destined for a second node. At the combiner node, the received data segments are combined and buffered with previously buffered data segments from the first node if present until a first condition is met. At the combiner node, at least a portion of the combined data segments are sent to the second node when the first condition is met. The received data segments are combined in the combiner node prior to being sent to the second node so as to reduce processing and/or storage resources consumed by the second node.

In preferred embodiments, the first condition is met when a combiner timer expires, one of the received data segment includes a field that indicates the packet's level of importance (e.g., a TCP push flag), or a data length of at least a portion of the combined data is less than or equal to a window size indicated by the second node, wherein a maximum portion of the combined data that will fit within the indicated window size is sent to the second node. In other aspects of the invention, there is a wait for a predetermined amount of time and then it is determined whether there is congestion between the combiner node and the second node. When it is determined that there is congestion, the combiner timer is increase or reset. In another embodiment, when a number of total flows received into the combiner node changes, the combiner timer is set based on the number of total flows.

In another embodiment, data is received at the combiner node from the second node that is destined for the first node. At the combiner node, the received data is split into a plurality of segments. At the combiner node, the segments are sent to the first node. The received data is segmented in the combiner node prior to being sent to the first node so as to reduce processing and/or storage resources consumed by the second node.

In an alternative embodiment, the first condition is met when a last segment belonging to a same data group that was fragmented is received. The combined data that is sent to the second node includes all of the segments of the same fragmented data group. In yet another embodiment, when out-of-order data segments are received, the received out-of-order data segments are buffered with previously buffered data segments from the first node if present until missing data segments are received. The out-of-order data segments are reordered after missing data segments are received prior to combining the re-ordered data segments with previously buffered data segments. In a preferred embodiment, the received data is sent substantially immediately without the first condition being met to the second node when the received data has a relatively high priority. In another method embodiment, the received data segments are combined with previously buffered data segments having a same priority level as the received data segments and the first condition is met when a timer associated with the same priority level expires.

In another embodiment, the invention pertains to a router operable to combine data segments. The computer system includes one or more processors and one or more memory. At least one of the memory and processors are adapted to provide at least some of the above described method operations. In yet a further embodiment, the invention pertains to a computer program product for combining data segments. The computer program product has at least one computer readable medium and computer program instructions stored within at least one of the computer readable product configured to cause a combiner device to perform at least some of the above described method operations. In yet another embodiment, the invention pertains to an apparatus that includes one or more means for performing the above described method operations.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general terms, the present invention provides mechanisms for off-loading processing from a receiving node. For example, processing of packets sent from a client to a server are off-loaded to an intermediary device. In one embodiment, a device for combining and splitting data is located between one or more clients and a server. The combiner and splitter device is located relatively close to the server with few devices located between the combiner device and server. Said in another way, the combiner device, client, and server are configured such that the data size limit for packets travelling between the combiner device and the server is much larger than for packets traveling between the client and combiner device. In a TCP example, the maximum segment size for packets moving between the combiner device and the server device may be at least about two times as large as the MSS between the client and the combiner device. Likewise, the MTU between the combiner device and server may be at least about two times as large as the MTU between the client and the combiner device. In one implementation, the combiner device is coupled directly to the server. In another example, the MSS and MTU between the combiner device and the server are each at least four times as large as each of the MSS and MTU between the client and combiner device.

Figure 1:
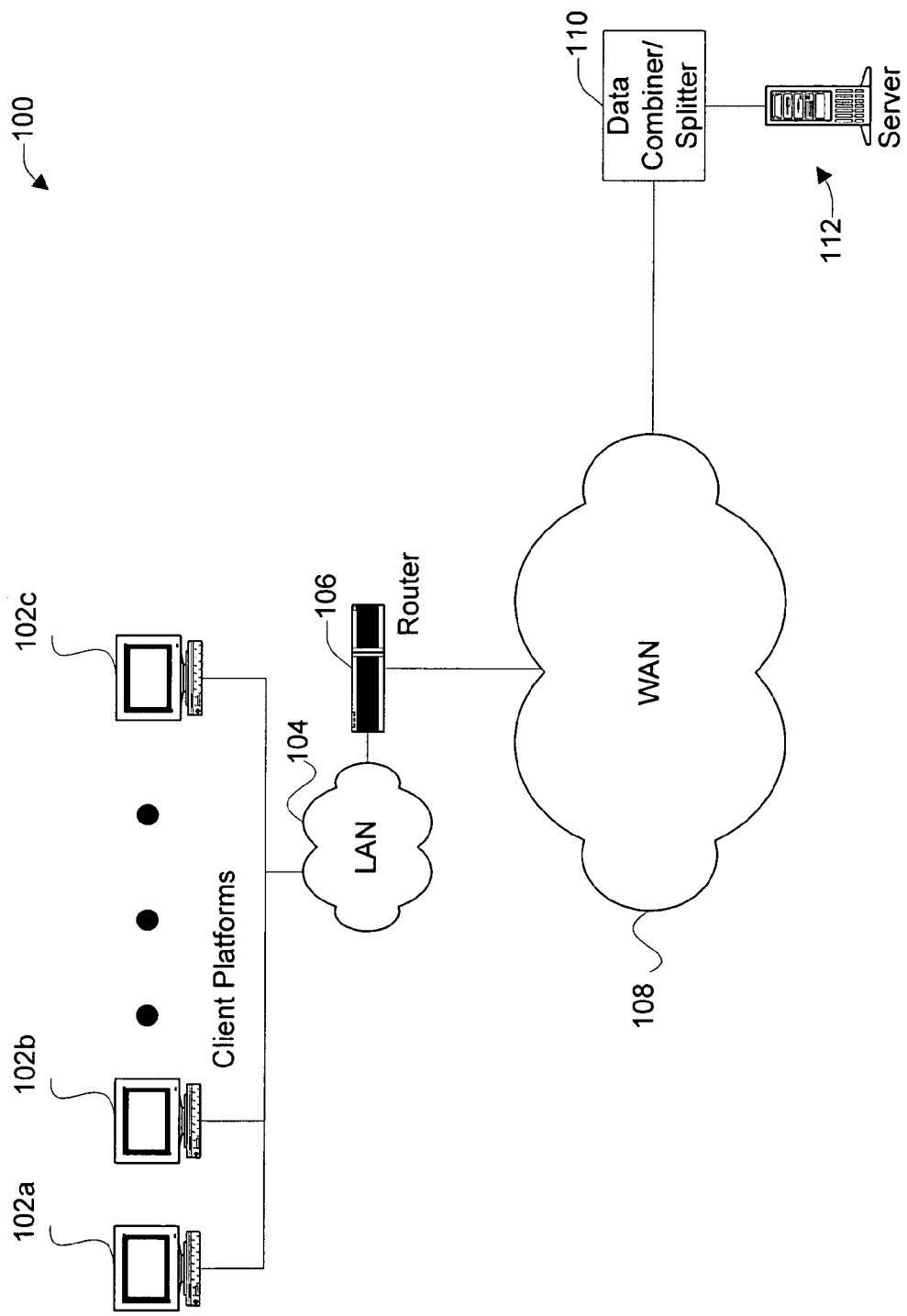
FIG. 1 is a diagrammatic representation of a computer network 100 in which the present invention may be implemented.

FIG. 1 is a diagrammatic representation of a computer network 100 in which the present invention may be implemented. According to this specific implementation, a plurality of client machines 102 which are resident on a local area network (LAN) 104 communicate via router 106 and wide area network (WAN) 108, e.g., the internet, with a server 112. Of course, some or all of the clients 102 may communicate with the router 106 through various other configurations, rather than through a LAN. For example, a client may be coupled directly to the router 106 or there may be one or more intermediate routers between a client 102 and the router 106. Additionally, although particular nodes are referred to as "clients" and other nodes are referred to as "servers", each node may function as a server (by responding to a data request) or a client (by making a data request).

Generally speaking, when a client platform (e.g., 102a) communicates with some remote server (e.g., 112), whether via the Internet or an intranet, it crafts a data packet which defines a TCP connection between the two hosts, i.e., the client platform and the destination server. More specifically, the data packet has headers which include the destination IP address, the destination port, the source IP address, the source port, and the protocol type. The destination IP address might be the address of a well known World Wide Web (WWW) search engine such as, for example, Yahoo, in which case, the protocol would be TCP and the destination port would be port 80, a well known port for http and the WWW. The source IP address would, of course, be the IP address for the client platform and the source port would be one of the TCP ports selected by the client. These five pieces of information define the TCP connection. Of course, any other suitable communication protocol may be utilized, besides or in addition to TCP. Of course, although the data transmission is described in terms of the TCP and IP protocols, this is not meant to limit the scope of the invention to this specific protocol.

The size of each packet that is sent between a client 102 and the server 112 is limited by the traffic size limits imposed by the network and/or server. Accordingly, a client 102 may transmit relatively small sized packets to the server to meet the size limitations imposed by the network.

As shown in FIG. 1, a data combiner 110 is also interposed between the clients 102 and the server 112. In one embodiment, the combiner may include one or more mechanisms for handling data arriving into the combiner 110 so as to off-load processing from the server 112. The handling mechanisms generally include one or more of the following procedures: combining small data segments received from a client and forwarding the combined data to the server, combining data fragments prior to sending the combined fragments the server, reordering data segments, and combining data segments based on priority, content of such data segments, or congestion. The combiner 110 may also handle data sent from server 112 to a client (e.g., client 102a). For example, the combiner 110 splits data received from node 112 into network friendly data segments before forwarding the data segments to a node 110. That is, the combiner 110 forms data segments that meet the data size requirements for data traveling between the combiner 110 and a client 102. Of course, the combiner 110 may also combine data sent from the server that is destined for a client. The server may off-load data to the combiner 110 as it is available for transmission even though the off-loaded data has a size that is far below the network requirements for data size.

Figure 2:
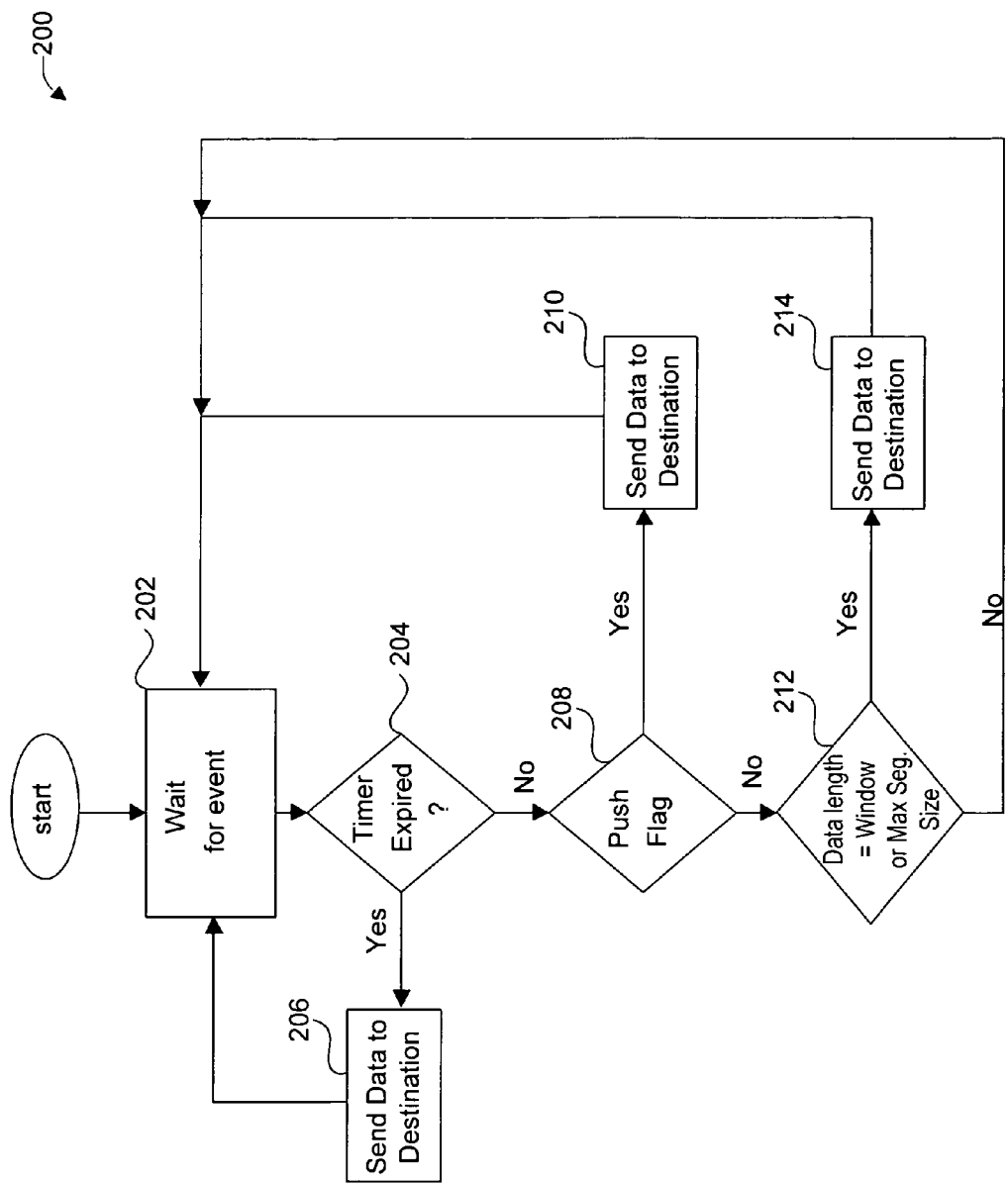
FIG. 2 is a flowchart illustrating a procedure for combining data segments in a combiner device in accordance with a first embodiment of the present invention.

FIG. 2 is a flowchart illustrating a procedure 200 for combining data segments in accordance with a first embodiment of the present invention. Initially, the combiner 110 waits for an event to occur in operation 202. The event may be any suitable trigger for causing the combiner device 110 to determine whether to combine received data segments. By way of examples, the event may include expiration of a timer or the receipt of a data segment into the combiner 110.

After the event occurs, it may then be determined whether one or more condition(s) have been met that triggers data segments that is buffered to be sent to the data's intended destination (e.g., server 112 or client 102). The conditions may include any suitable criteria for determining whether the combiner device 110 combines and sends the buffered data segments. Additionally, the combiner device 110 may combine and send the buffered data segments after any of the conditions are met or after all of the conditions are met.

In the illustrated embodiment, it is determined whether a combine timer has expired in operation 204. Any suitable value may be selected for the combine timer, which selected value depends on the level of traffic through such combiner device 110. For instance, the combiner device 110 may track the average time for accumulating enough data segments that when combined equal the destination site's advertised window size. If the combine timer has expired, data segments buffered within the data combiner 110 (if present) are then sent in operation 206. If the combine timer has not expired, it is then determined whether a push flag associated with the received data (last received data or buffered data) is set or present in operation 208. Of course, any suitable type of packet field or flag may be used to indicate whether the packet is important (e.g., data should be transmitted substantially immediately). If the push flag is set or present, the buffered and combined data within combiner 110 is then sent in operation 210. If the push flag is not set or present, it is then determined whether the data received or the buffered data within combiner 110 has a size that is greater than or equal to a window size or maximum segment size advertised by the destination site. If the data size is greater, the data is then sent to the destination site in operation 214. If the data length is not greater, the procedure 200 repeats at operation 202.

Figure 3A:
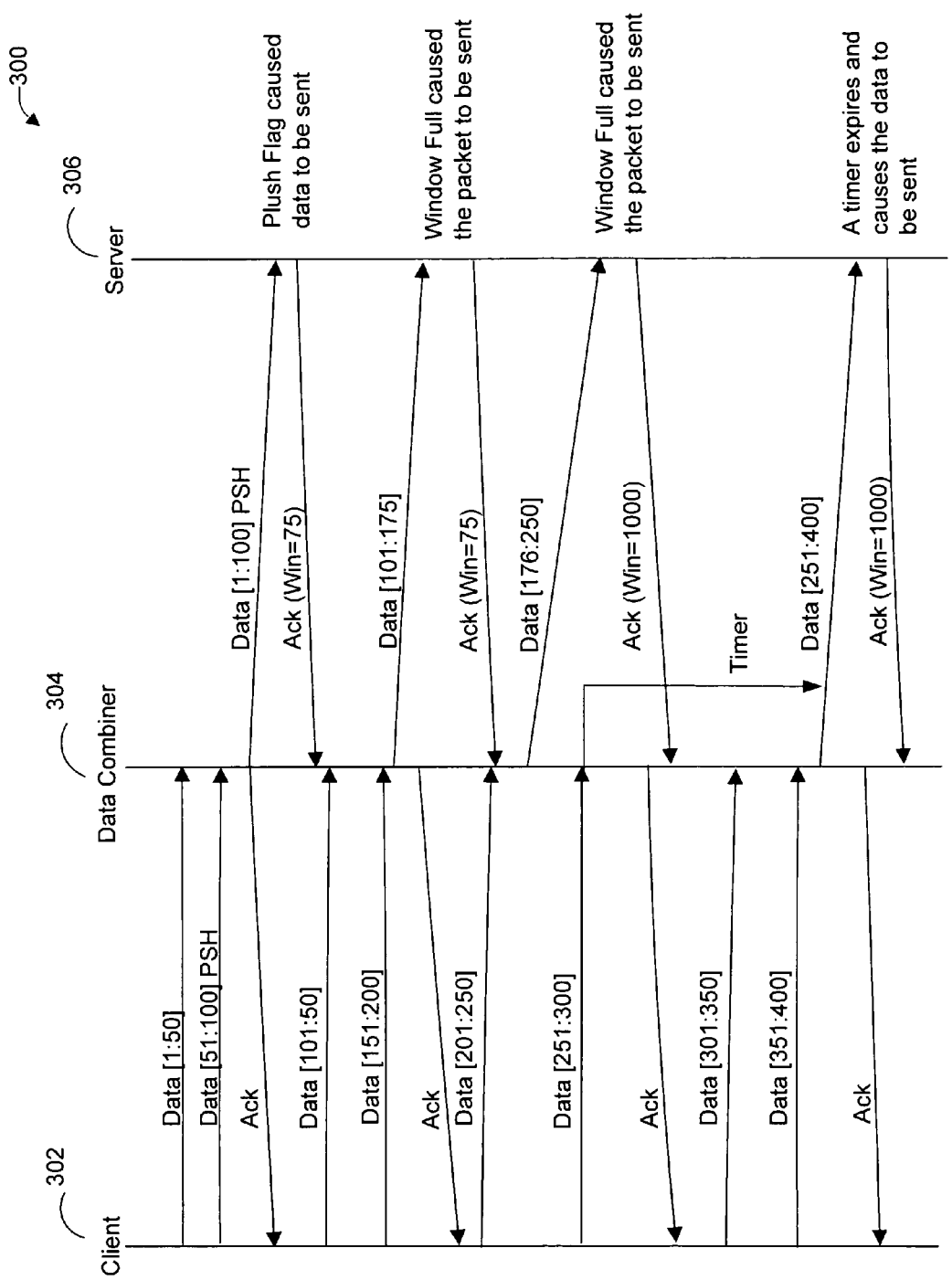
FIG. 3A is a communication diagram illustrating packets being sent from a client, combined in a data combiner device, and then sent to a server in accordance with the first embodiment of the present invention.

FIG. 3A is a communication diagram 300 illustrating packets being sent from a client 302, combined in a data combiner 304, and then sent to a server 306 in accordance with the first embodiment of the present invention. (Of course, such a mechanism may also be applied to a server sending data segments to a client.) In the communication between any of the pairs of nodes, numbers are assigned to each byte of data sent across. In FIG. 3A as well as other communication diagrams that follow FIG. 3A, the first and last sequence number of the bytes in the packet are indicated. For example, data indicates that this packet contains bytes 1 through 50. Of course, the data may grouped into other sizes, such as octets.

Initially, data packet having bytes 1 through 50 are sent to data combiner 304. The data combiner 304 retains the received data packet bytes 1 through 50 until a condition for combining and sending at least a portion of the buffered data packet bytes is met. The client 302 then sends data packet bytes 51 through 100 along with a push flag to data combiner 304. Since the data packet bytes 51 through 100 includes a push flag, the data combiner 304 then sends the buffered data bytes 1 through 100 together to server 306. In other words, the push flag is a condition that is met which thereby causes the data combiner to send the buffered data to server 306.

Other mechanisms may be used to trigger the data combiner 304 to send combined and buffered data to server 306. For example, the server 306 may indicate a full window (there enough buffered segments to meet the window size indicated by the server). As shown, the server 306 indicates a window size value within its acknowledgment for the last set of data packet bytes 1 through 100 which were sent by the combiner 304 to the server. Specifically the acknowledgment specifies a window size of 75. After the data combiner 304 receives the window size indication, data is accumulated until the indicated window size is reached. Of course, if the window size has already been reached (window is full) by already buffered data, a portion of the buffered data is sent that equals the indicated window size. As shown, after a window indication of 75 is received, data combiner 304 receives data packet bytes 101 through 150 and retains these packet bytes until packet bytes 151 through 200 are received. After packet bytes 151 through 200 are received, the data combiner 304 sends packet bytes 101 through 175 to server 306. The amount of data sent is equal to the indicated window size (i.e., 75). The indicated window size may be any suitable size. As shown the server indicates a window size of 75 two times and a window size of 1000 at two other times. In each case where a window size indication is received by data combiner 304, data of the indicated size is immediately sent to the server 306.

Of course, other metrics besides window size may be used to trigger the data combiner 304 to send combined data. By way of examples, combined data segments may be sent to the server 306 when the combined data segments reach the MTU or MSS of the network or server between the data combiner 304 and the server 306. Additionally, if the network or server is not ready to receive data (e.g., the network is congested or the server advertises a window of 0), the combiner 304 merely buffers and combines all received data until the network and server are ready. Suitably sized portions of combined data are then sent to the server 306.

Another mechanism for causing data buffered within data combiner 304 and/or data received into data combiner to be sent to server 306 is the expiration of a combine timer. As shown, the data combiner 304 sends data 251 through 400 to server 306 after expiration of a combine timer. The size of the data sent, of course, meets the size requirements for the network between the combiner 304 and the server306.

Figure 3B:
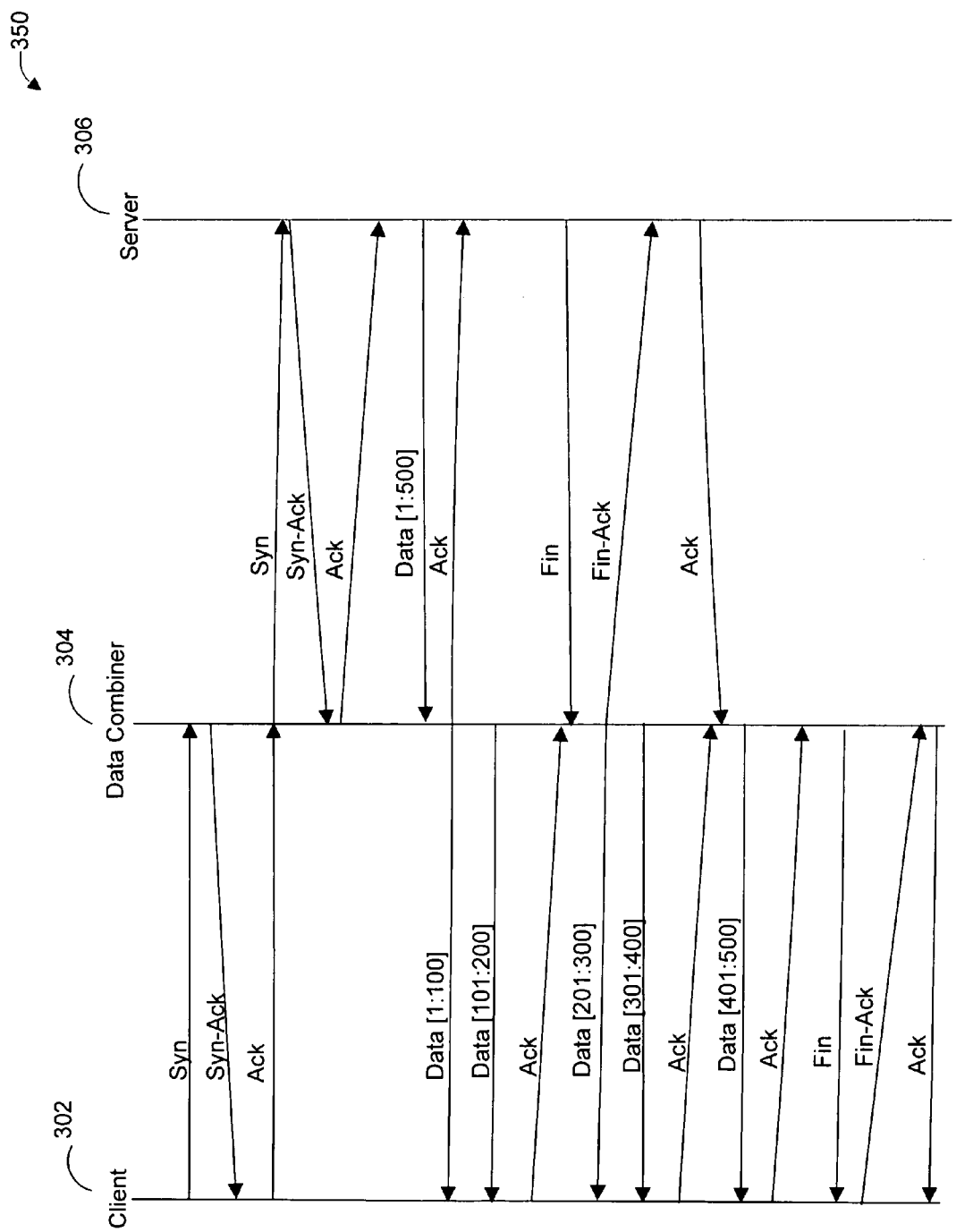
FIG. 3B is a communication diagram illustrating data being sent from a server, split into network friendly segments, and sent to a client in accordance with the first embodiment of the present invention.

FIG. 3B is a communication diagram 350 illustrating data being sent from a server 306, split into network friendly segments, and sent to a client 302 in accordance with the first embodiment of the present invention. In general terms, data sent from server 306 to data combiner 304 is split into manageably sized data segments. As shown, the server 306 sends data 1 through 500 to data combiner 304. The data combiner 304 then sends data 1 through 100, and then sends data 101 through 200 to client 302. The data combiner 304 then sends three more sets of data: data 201 through 300, data 301 through 400, and data 401 through 500 to client 302. This procedure allows the server 306 to off-load large amounts of data so that the connection may the be closed thereby freeing up valuable resources. That is, the server 408 frees up the connection, as well as conserving processing resources that would conventionally be used to segment the data.

In TCP, for example, one of the parameters that limits the packet transmission is the maximum segment size (MSS) of a packet through a network. MSS is usually advertised between a client and a server, but may also be dictated by the network itself. That is, the packet size may depend on the maximum transmission unit (MTU) of the network between the client and server. If a packet is too large for a router in the network to handle, the router may fragment the packet, process the fragments, and then forward the fragments to the fragments' destination (e.g., server). This fragmentation will result in additional computation cycles being performed by the server. Accordingly, a second embodiment of the present invention includes mechanisms for off-loading processes to combine fragments from the server to the combiner device before they reach the server so as to free up the server's processing resources for other tasks besides processing fragments.

Figure 4:
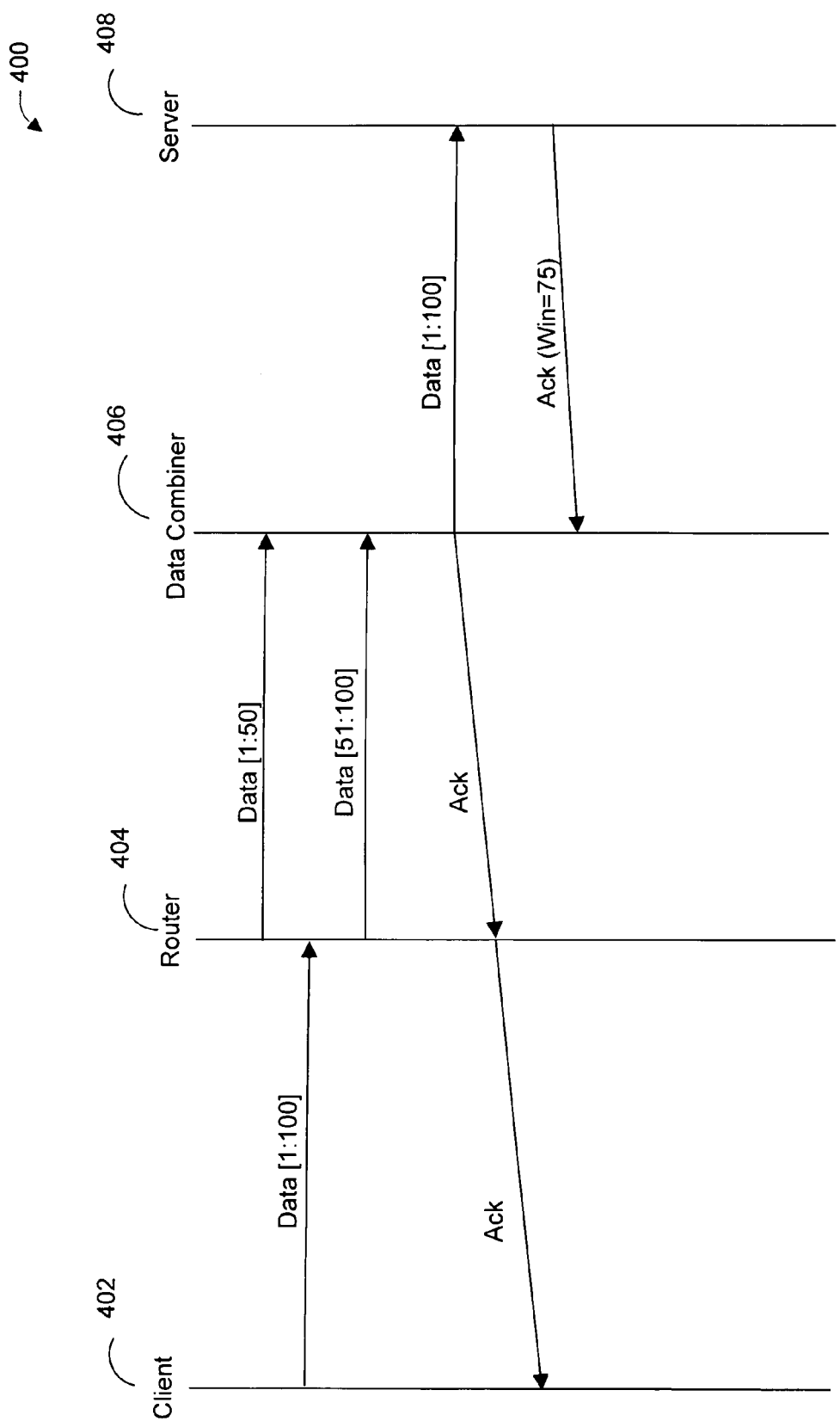
FIG. 4 is a communication diagram illustrating data sent from a client, through router which fragments the data, through a data combiner device which combines the fragment and sends to server in accordance with a second embodiment of the present invention.

FIG. 4 is a communication diagram 400 illustrating data sent from a client 402, through router 404 which fragments the data, through data combiner 406 which combines the fragment and sends to server 408 in accordance with a second embodiment of the present invention. In this illustrated embodiment, data that is received into router 404 is then fragmented into a plurality of data fragments that are then sent to data combiner 406. As shown, the client 402 sends data 1 through 100 to router 404. The router 404 then fragments this data and sends data 1 through 50 and then sends data 51 through 100 to data combiner 406. The data combiner 406 buffers each fragment and then sends combined data 1 through 100 it to server 408. In other words, the data combiner 406 combines the fragments and forwards the resulting packet to the server 408. Likewise, the combiner 406 may also combine data segments (e.g., TCP segments sent from client 402) as described above with reference to FIG. 3A, in addition to combining fragments (e.g. IP fragments sent from router 404).

Figure 5:
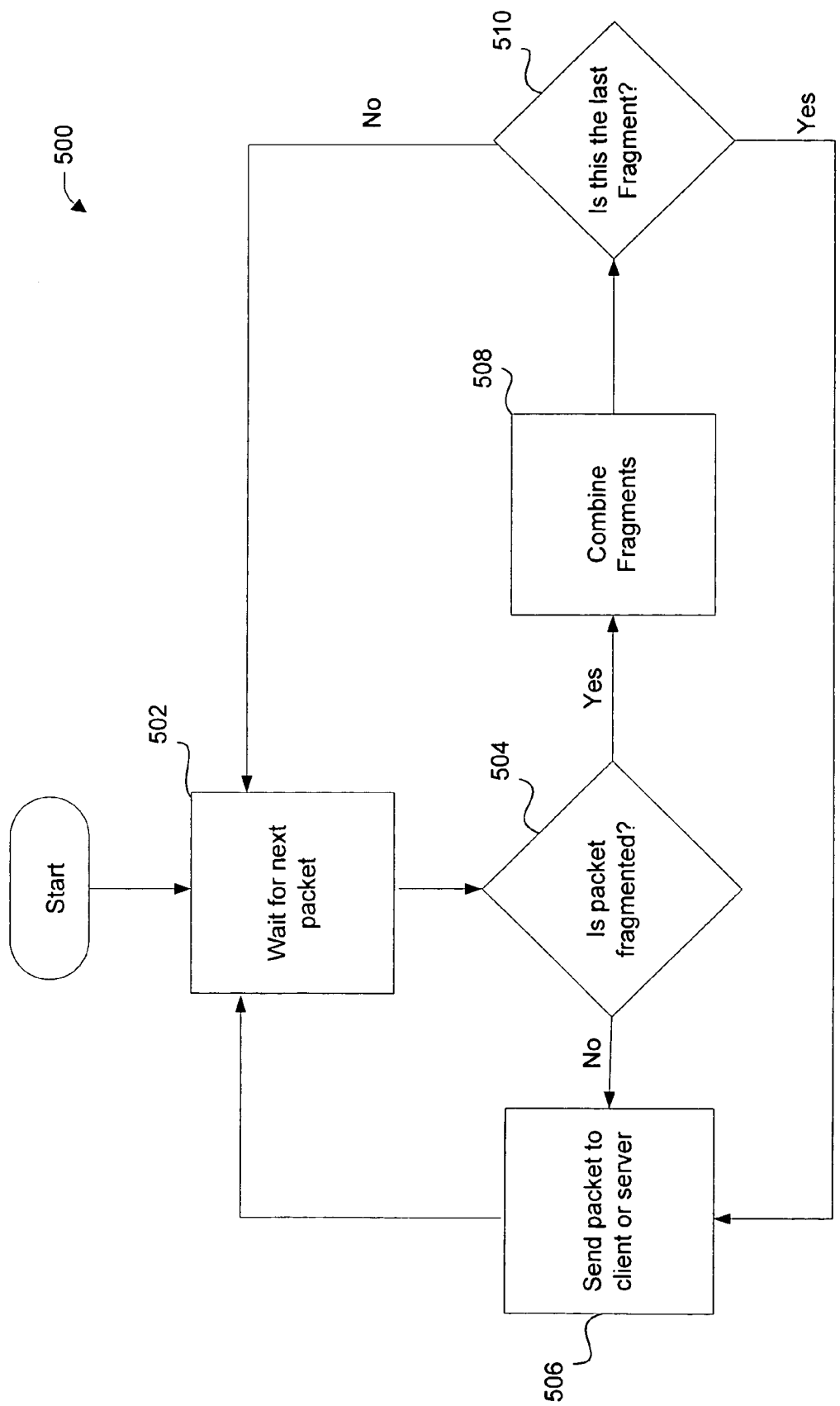
FIG. 5 is a flowchart illustrating a procedure for combining fragments at a combiner device in accordance with the second embodiment of the present invention.

FIG. 5 is a flowchart illustrating a procedure 500 for combining fragments at a combiner device in accordance with the second embodiment of the present invention. Initially, the combiner waits for a next or first packet in operation 502. When a packet is received, it is then determined whether the packet is fragmented in operation 504. For example, the packet has a fragment flag that specifies whether the packet is a fragment. If the fragment flag is set, it is determined that the packet is a fragment. Otherwise, it is determined that the packet is not a fragment. If the packet is not fragmented, the packet is merely sent to the client or server, depending on whether the packet was received by the server or client. Alternatively, packets may be buffered and combined prior to being transmitted to their destination. If the packet is fragmented, the fragments are buffered and combined with other previously buffered fragments in operation 508. It is then determined whether this is a last fragment in operation 510. For example, the packet has a field to indicate that it is the last fragment, which field is analyzed to determine whether the packet is the last fragment. If this is not the last fragment, the combiner then buffers the fragment and waits for the next packet in operation 502. However, if this is the last fragment, the resulting packet (combined fragments) is then sent to the client or server in operation 506. Of course, packets may be buffered and combined with other packets. The procedure 500 then repeats in operation 502.

In a network, continuous IP packets, for example, may be received out of order. Out of order packets received into a receiving node require the receiving node to save a received out of order packet and wait for the late or possibly retransmitted packet to arrive. Accordingly, out of order packets may take valuable storage space of a receiving node or server. A third embodiment of the present invention includes mechanisms for off-loading processing to reorder packets to the combiner device.

Figure 6:
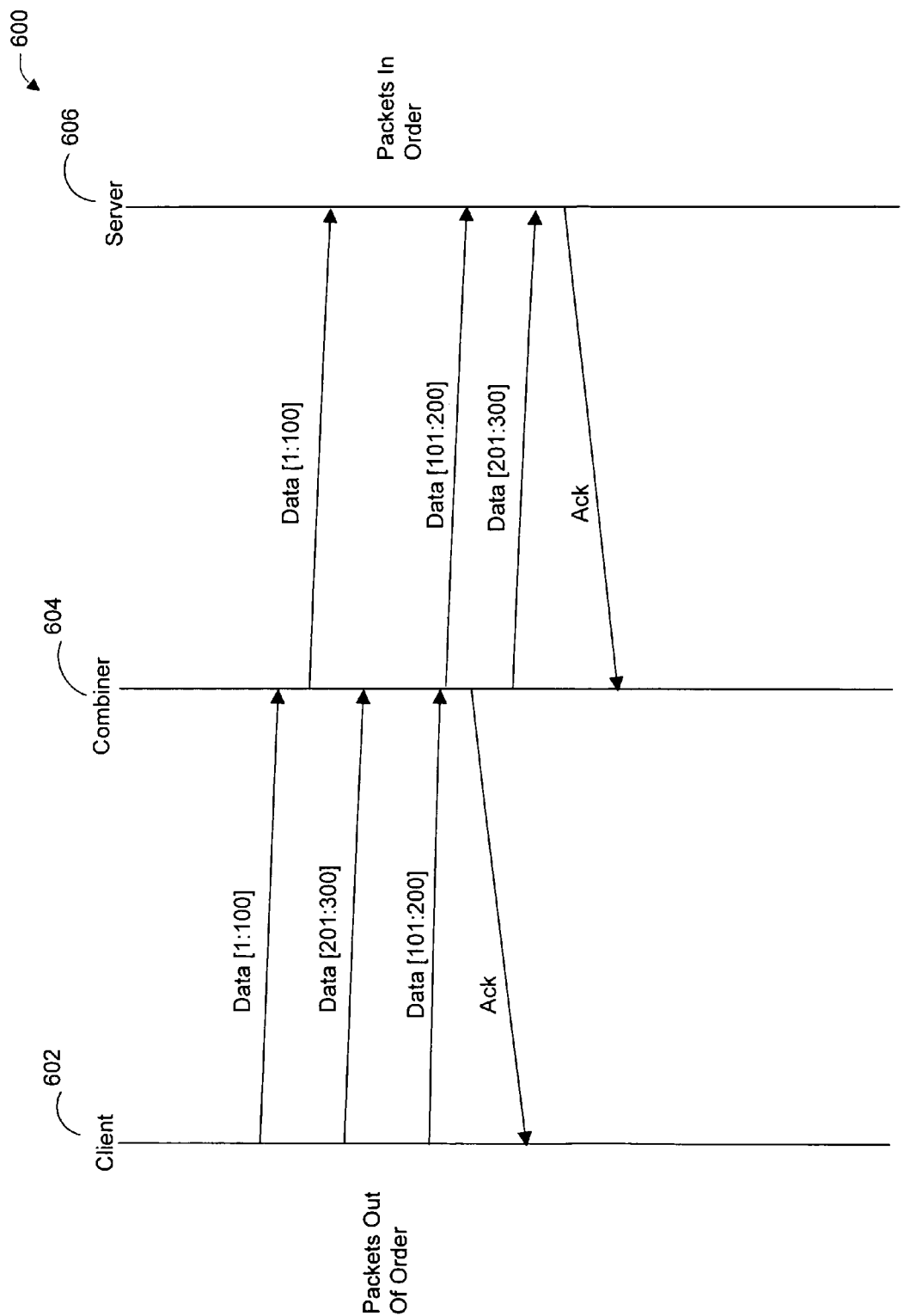
FIG. 6 is a communication diagram that illustrates data being sent from a client, reordered at a combiner device, and sent to a server in accordance with a third embodiment of the present invention.

FIG. 6 is a communication diagram 600 that illustrates data being sent from a client 602, reordered at a combiner 604, and sent to a server 606 in accordance with a third embodiment of the present invention. When data is sent from the client and received by the combiner out of order, the data is re-ordered by the combiner/splitter. As shown, the client 602 sends data 1 through 100 to combiner 604, then sends data 201 through 300 to combiner/splitter, and then sends data 101 through 200 to combiner 604.

When the combiner 604 receives the data 1 through 100, it forwards this data to server 604. However, when the combiner 604 receives out-of-order data 201 through 300, the combiner 604 retains this data 201 through 300. The combiner 604 then waits for a data 101 through 200. When the data 101 through 200 is received by combiner 604, the data 101 through 200 is then sent to the server 606. The buffered data 201 through 300 is then sent to the server. Of course, this reordering procedure maybe combined with the above described procedure for combining data segments and/or fragments.

Figure 7:
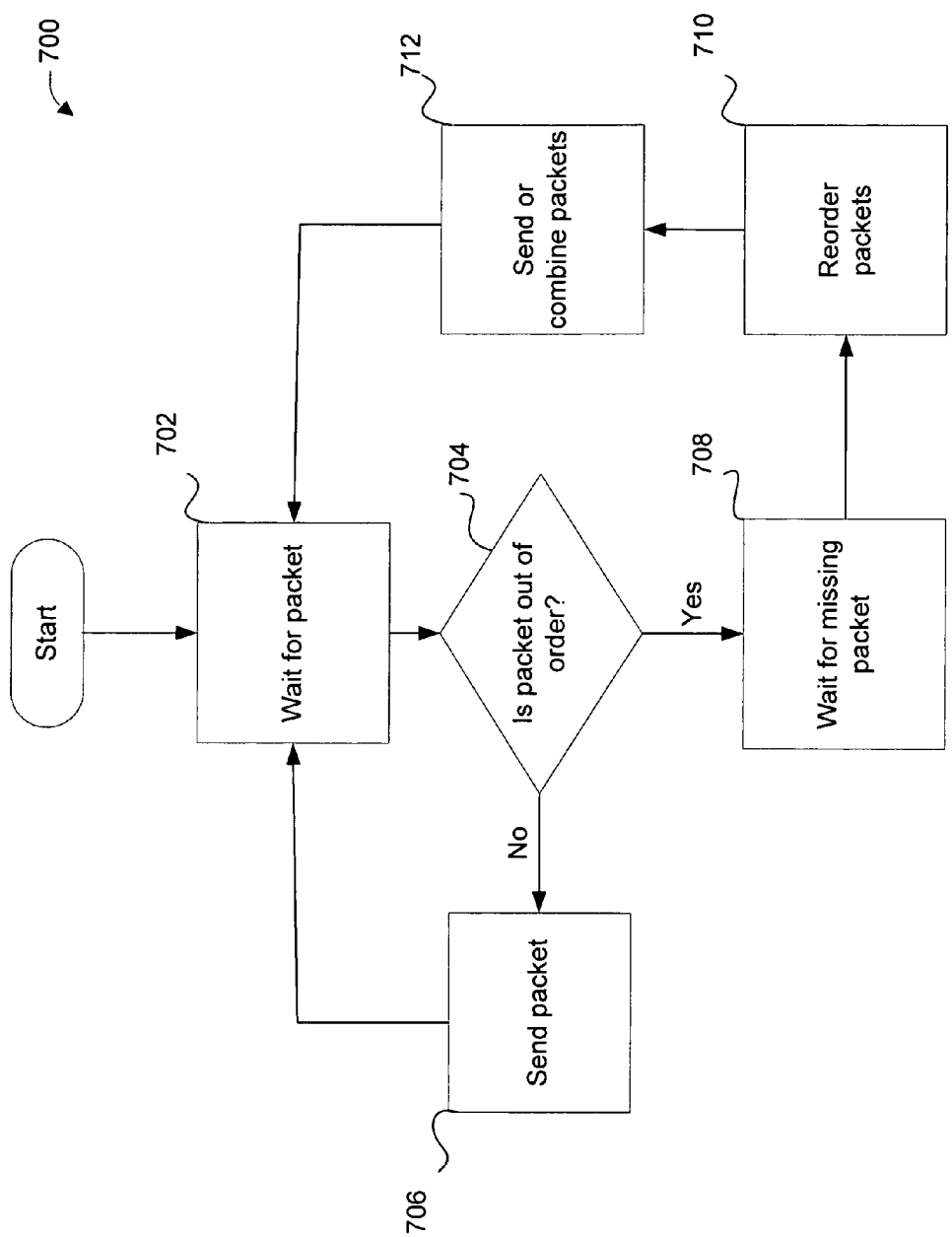
FIG. 7 is a flowchart illustrating a procedure for re-ordering packets in accordance with the third embodiment of the present invention.

FIG. 7 is a flowchart illustrating a procedure for re-ordering packets in accordance with the third embodiment of the present invention. Initially, the combiner waits for a packet in operation 702. When a packet is received, it is then determined whether the packet is out of order in operation 704. If the packet is not out of order, the packet may be sent in operation 706. Of course, other mechanisms for buffering and combining data segments and/or fragments as described above may be integrated with the re-ordering procedure. For example, packets that are deemed to be in order are buffered and combined prior to sending to the server.

If the packet is out of order, the combiner then waits for the missing packet in operation 708. Meanwhile, all out-of-order packets are buffered in the combiner/splitter, for example. When the missing packet is received, the packets are re-ordered and then sent in operation 710 and 712. Of course, two or more of the re-ordered packets may be combined prior to sending in operation 712.

Figure 8:
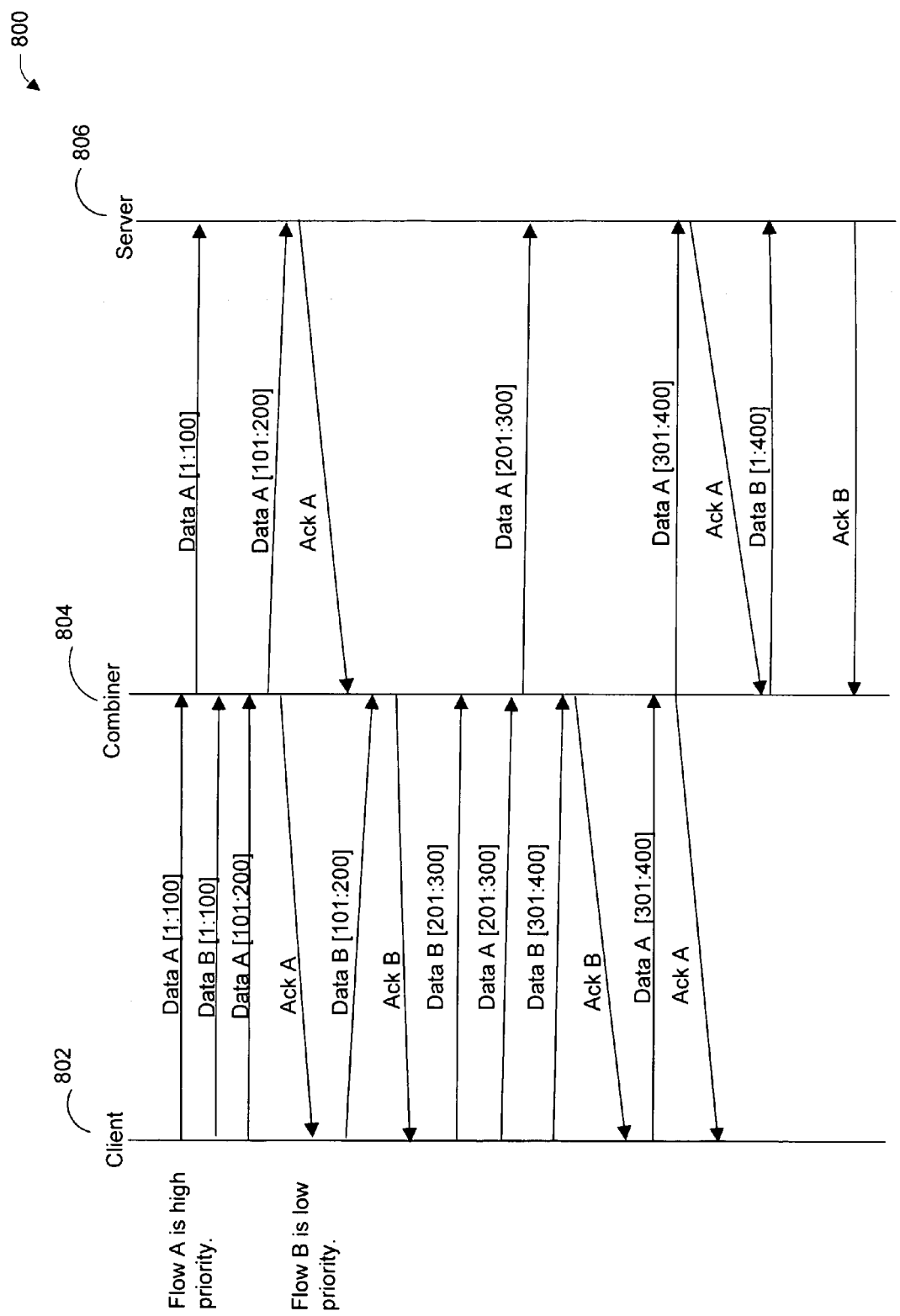
FIG. 8 is a communication diagram that illustrates data being sent from a client and combined at a combiner and sent to the server or immediately forwarded to server based on a priority level of the data in accordance with a fourth embodiment of the present invention.

FIG. 8 is a communication diagram 800 that illustrates data being sent from a client 802 and combined at a combiner 804 and sent to the server 806 or immediately forwarded to server 806 based on a priority level of the data in accordance with a fourth embodiment of the present invention. In the illustrated example, flow A has a high priority, while flow B has a low priority. When data from flow A is received into combiner 804, the data is immediately forwarded to server 806. As shown, Data 1 through 100 from flow A is immediately forwarded to server 806. In contrast, data for flow B is buffered by combiner and the above described combining procedures are implemented for the buffered data. As shown, when the data for flow B has reached a size of 400 (e.g., the server has indicated a window size of 400), the combiner 804 then sends such data to server 806.

Figure 9:
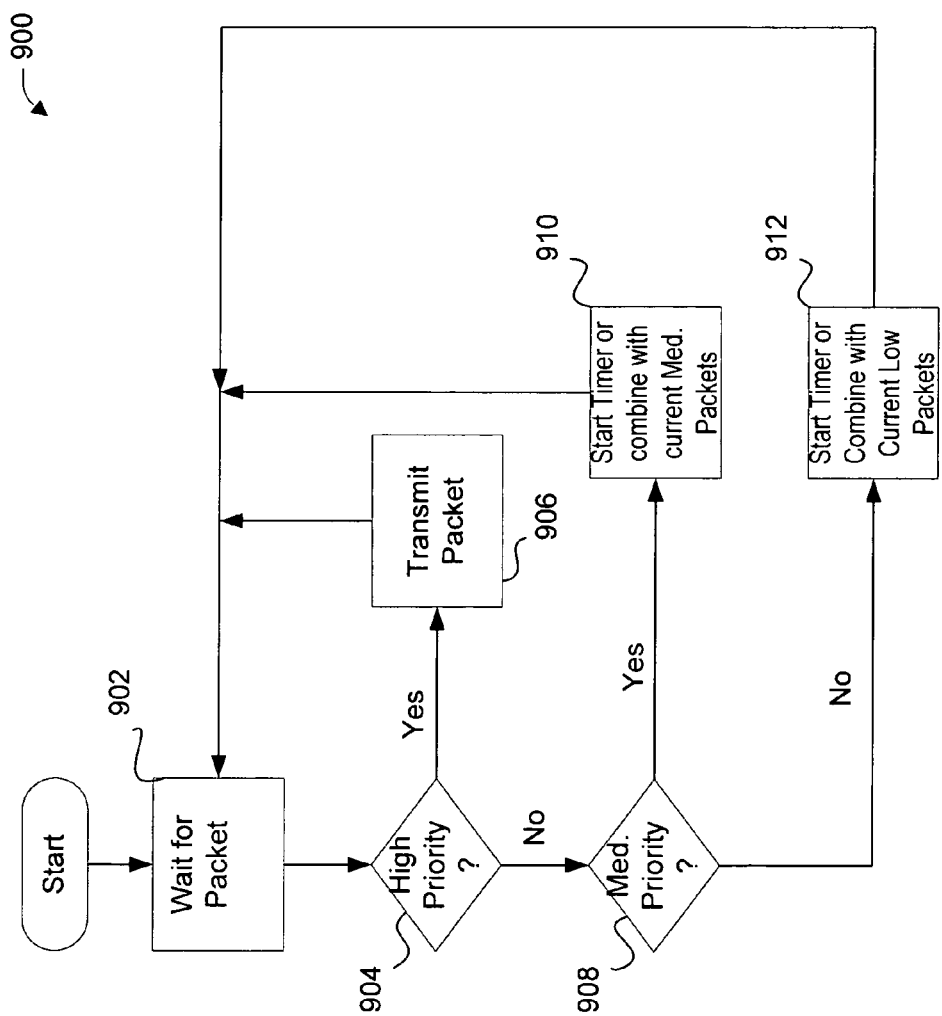
FIG. 9 is a flowchart illustrating a procedure for forwarding and combining packets based on priority in accordance with an alternative fourth embodiment of the present invention.

FIG. 9 is a flowchart illustrating a procedure 900 for forwarding and combining packets based on priority in accordance with an alternative fourth embodiment of the present invention. Priority is assigned to a packet based on its estimated importance. For example, real-time voice packet would typically be assigned a higher priority than an email packet since a voice packet is typically time critical. Priority may be assigned based on any suitable type and number of factors. By way of examples, priority may be based on service level agreements, IEEE 802.1p Class of Service, VLAN assignment, and/or any quality of service metric.

In this embodiment, the packets may have one of three priority levels. Of course, any suitable number of priority levels may be checked. In the illustrated example of FIG. 9, the combiner waits for a packet in operation 902. When a packet is received, it is then determined whether the packet has a high priority in operation 904. If the packet has a high priority, the packet is substantially immediately transmitted in operation 906. That is, the high priority packet is not retained and combined with other packets. If the packet does not have a high priority, it may then be determined whether the packet has a medium priority in operation 908. If the packet has a medium priority, a medium priority timer may then be set and the received packet are combined with other previously buffered medium priority packets (if present) in operation 910. Similarly to the above described combination techniques, at least a portion of the combined medium priority packets are transmitted when the medium timer expires.

If the packet is not a medium priority packet, a low priority timer may then be set and the low priority packet combined with other low priority packets in operation 912 until the low timer expires. When the low timer expires or some other condition is met (the window is fill or the low priority packets for that flow change to high priority), at least a portion of the combined low priority packets are then sent to the server. The procedure 900 then repeats where the combiner waits for a next packet in operation 902.

Figure 10:
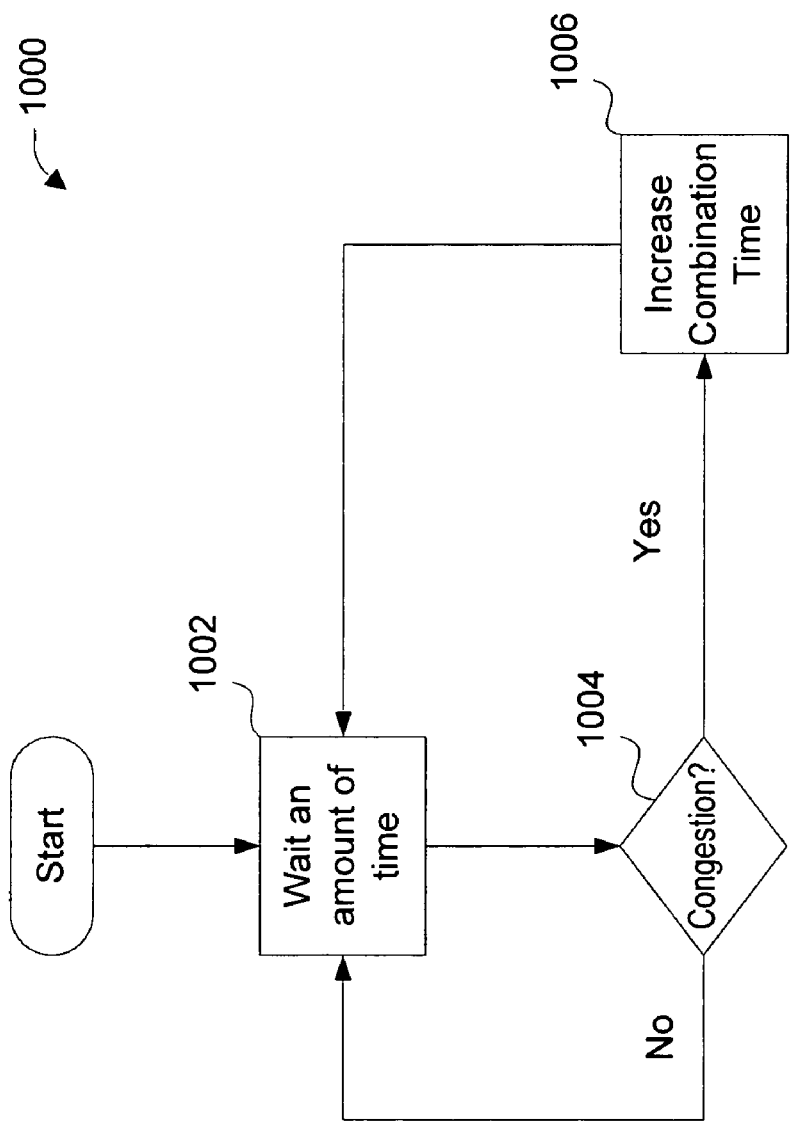
FIG. 10 is a flowchart illustrating a procedure for combining packets based on congestion in accordance with a fifth embodiment of the present invention.

FIG. 10 is a flowchart illustrating a procedure 1000 for combining packets based on congestion in accordance with a fifth embodiment of the present invention. Examples of congestion may include, but are limited to, server congestion, network congestion, memory congestion, and/or processor congestion. Initially, the combiner waits a predetermined amount of time in operation 1002. After expiration of the predetermined time, it is then determined whether there is congestion present in operation 1004. If there is no congestion, the combiner then waits again for a predetermined amount of time in operation 1002. If there is congestion present, the combination time is then increased in operation 1006. In other words, the time that packets are retained by the combiner is increased. Of course, this procedure 1000 may also include mechanisms for decreasing the combination timer when congestion has decreased.

Figure 11:
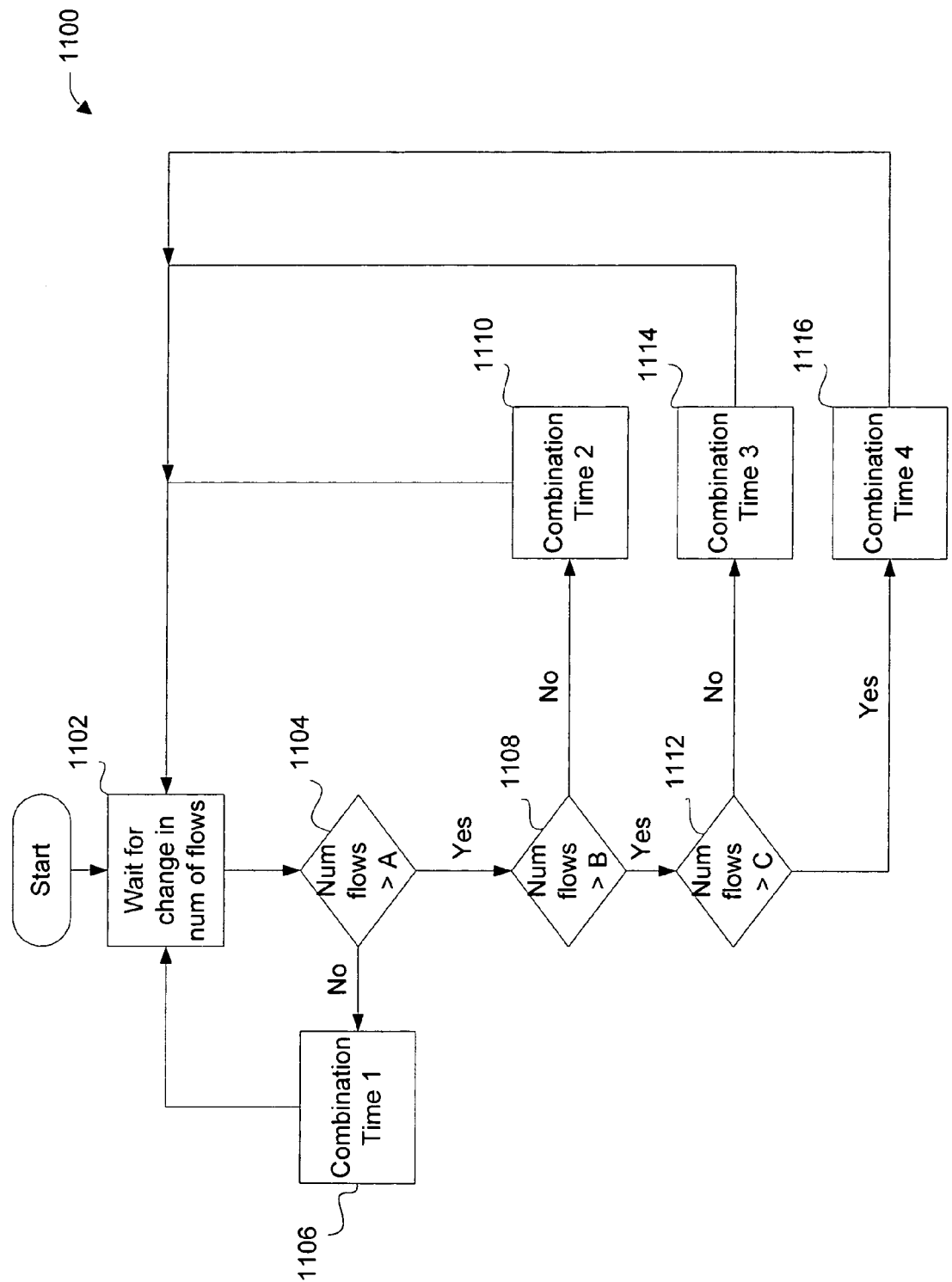
FIG. 11 is a flowchart illustrating a procedure for combining packets based on the number of flows present in accordance with a sixth embodiment of the present invention.

FIG. 11 is a flowchart illustrating a procedure 1100 for combining packets based on the number of flows present in accordance with a sixth embodiment of the present invention. Initially, the combiner waits for a change in the number of flows in operation 1102. When the flow number changes, it is then determined whether the number of flows is greater then a first predetermined flow number in operation 1104. If the flow number is not greater than the first predetermined flow number, the combination timer is set to a first combination time in operation 1106. If the number of flows is greater than the first flow number, it is then determined whether the number of flows is greater than a second predetermined flow number in operation 1108. If the number of flows is not greater than the second flow number, a second combination timer is then set in operation 1110. If the number of flows is not greater than a second flow number, it is then determined whether the number of flows is greater than a third predetermined flow number in operation 1112. If the number of flows is greater than the third flow number, a third combination timer is then set in operation 1114. If the number of flows is greater than the third predetermined number, a fourth combination timer is then set in operation 1116. The procedure 1100 then repeats where the combiner waits for the number of flows to change in operation 1102. Of course, any suitable number of flow number thresholds may be used to set different combination times based on the number of flows.

Generally, the techniques for off-loading processing from a server or other processing node of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application ring on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet processing systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the packet processing system (e.g., combiner device) may be implemented on a general-purpose network host machine such as a personal computer or workstation. Further, the invention may be at least partially implemented on a card (e.g., an interface card) for a network device or a general-purpose computing device.

Figure 12:
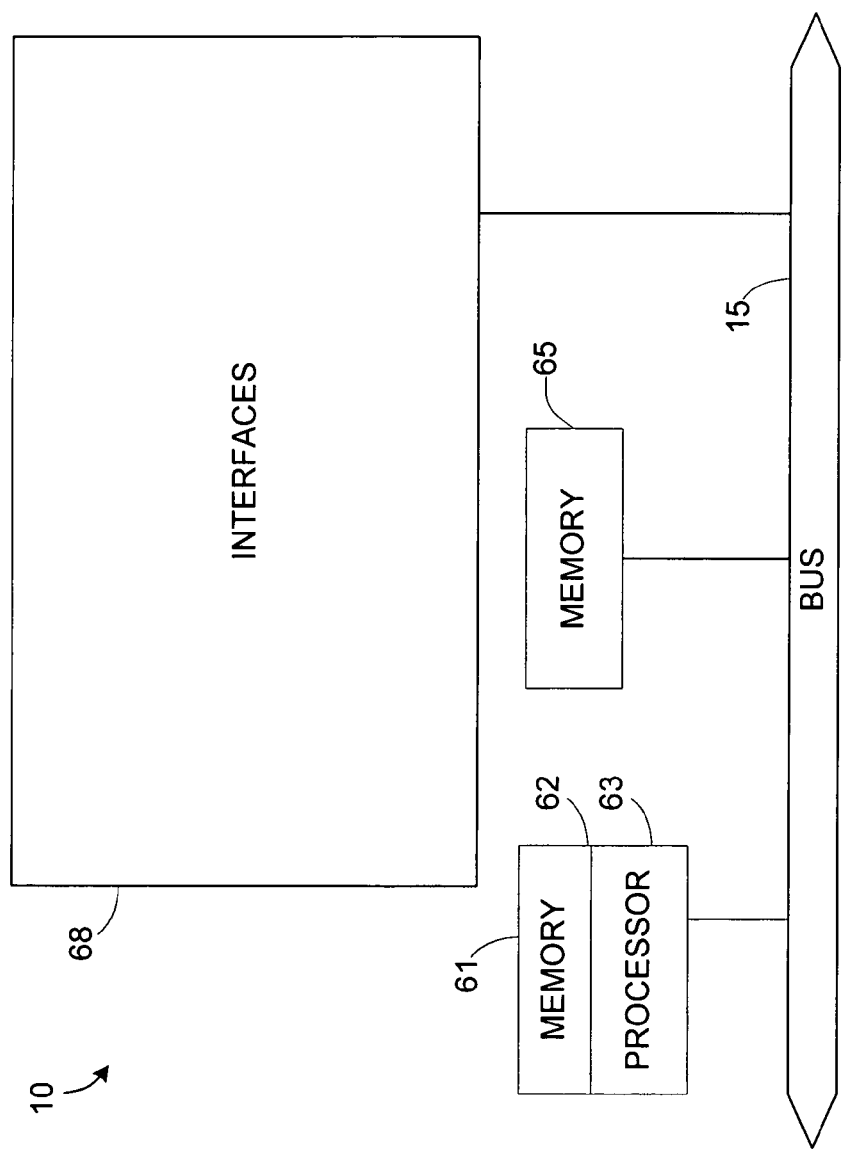
FIG. 12 is a diagrammatic representation of a router in which embodiments of the present invention may be implemented.

Referring now to FIG. 12, a router 10 suitable for implementing the present invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for combining small data segments received from a client and forwarding the combined data to the server (or visa versa), combining data fragments prior to sending the combined fragments the server, reordering data segments, and combining data segments based on priority, content of such data segments, or congestion, etc. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 12 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications, for example. The memory or memories may also be configured to store received packets, identifiers to track each flow and the number of such flows, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method for handling data, the method comprising:
    at a combiner node, establishing a flow between a first node and the combiner node;
    at the combiner node, receiving data segments from the first node that are destined for a second node;
    at the combiner node, combining and buffering the received data segments with previously buffered data segments from the first node, if present, until a first condition is met;
    at the combiner node, sending at least a portion of the combined data segments to the second node when the first condition is met,
    at the combiner node, receiving data from the second node that is destined for the first node;
    at the combiner node, splitting the received data into a plurality of segments; and
    at the combiner node, sending the segments to the first node,
    wherein the received data segments are combined in the combiner node prior to being sent to the second node and wherein the received data is segmented in the combiner node prior to being sent to the first node so as to reduce processing and/or storage resources consumed by the second node.

2. A method as recited in claim 1, wherein the first condition is met when a first received data segment includes a field that indicates whether the data segment is important.

3. A method as recited in claim 1, wherein the first condition is met when a data length of at least a portion of the combined data is less than or equal to a window size indicated by the second node, wherein a maximum portion of the combined data that will fit within the indicated window size is sent to the second node.

4. A method as recited in claim 1, wherein data that travels between the first node and the second node has a first maximum data size and data that is traveling between the combiner node and the second node has a second maximum data size, the first maximum size being substantially smaller than the second maximum data size, wherein the combined data segments sent to the second node have an associated size that is less than or equal to the second maximum data size.

5. A method as recited in claim 4, wherein the first and second maximum data size are selected from a group consisting of a first and second window size, a first and second maximum segment size, and a first and second maximum transmission unit.

6. A method as recited in claim 1, further comprising:
at the combiner node, receiving data from the second node that is destined for the first node;
at the combiner node, splitting the received data into a plurality of segments; and
at the combiner node, sending the segments to the first node,
wherein the received data is segmented in the combiner node prior to being sent to the first node so as to reduce processing and/or storage resources consumed by the second node.

7. A method as recited in claim 1, wherein the first condition is met when a last segment belonging to a same data group that was fragmented is received, wherein the combined data that is sent to the second node includes all of the segments of the same fragmented data group.

8. A method as recited in claim 1, further comprising:
when out-of-order data segments are received, buffering the received out-of-order data segments with previously buffered data segments from the first node if present until missing data segments are received; and
reordering the out-of-order data segments after missing data segments are received prior to combining the re-ordered data segments with previously buffered data segments.

9. A method as recited in claim 1, further comprising sending the received data segments substantially immediately without the first condition being met to the second node when the received data segments have a relatively high priority.

10. A method as recited in claim 9, wherein the received data segments have a relatively high priority based on information contained in the received data segments.

11. A method as recited in claim 9, wherein the received data segments are combined with previously buffered data segments having a same priority level as the received data segments and the first condition is met when a timer associated with the same priority level expires.

12. A method as recited in claim 11, wherein there are a plurality of timers each associated with a different priority level.

13. A method as recited in claim 1, further comprising:
at the combiner node, establishing a second flow between the second node and the combiner node.

14. A method as recited in claim 1, wherein the first condition is met when a combiner timer expires.

15. A method for handling data, the method comprising:
at a combiner node, establishing a flow between a first node and the combiner node, wherein establishing the flow comprises having a set of Syn, Syn-Ack, Ack, Fin, Fin-Ack and Ack data exchanges;
at the combiner node, receiving data segments from the first node that are destined for a second node;
at the combiner node, combining and buffering the received data segments with previously buffered data segments from the first node, if present, until a first condition is met;
at the combiner node, sending at least a portion of the combined data segments to the second node when the first condition is met,
at the combiner node, receiving data from the second node that is destined for the first node;
at the combiner node, splitting the received data into a plurality of segments; and
at the combiner node, sending the segments to the first node,
wherein the received data segments are combined in the combiner node prior to being sent to the second node and wherein the received data is segmented in the combiner node prior to being sent to the first node so as to reduce processing and/or storage resources consumed by the second node.

16. A method as recited in claim 15, wherein the first condition is met when a combiner timer expires, the method further comprising:
waiting a predetermined amount of time and then determining whether there is congestion between the combiner node and the second node; and
when it is determined that there is congestion, increasing or resetting the combiner timer.

17. A method as recited in claim 15, wherein the first condition is met when a combiner timer expires, the method further comprising:
when a number of flows received into the combiner node changes, setting the combiner timer based on the number of flows.

18. A method as recited in claim 17, wherein the combiner timer is set to a selected one of a plurality of times, wherein each time selection is based on whether the number of flows has reached a particular threshold level.

19. A router operable to handle data, the router comprising:
one or more processors;
one or more memory, wherein at least one of the processors and memory are adapted to:
at the router, establish a flow between a first node and the router;
at the router, receive data segments from the first node that are destined for a second node;
at the router, combine and buffering the received data segments with previously buffered data segments from the first node if present until a first condition is met;
at the router, send at least a portion of the combined data segments to the second node when the first condition is met,
at the router, receiving data from the second node that is destined for the first node;
at the router, splitting the received data into a plurality of segments; and
at the router, sending the segments to the first node,
wherein the received data segments are combined in the router prior to being sent to the second node and wherein the received data is segmented in the router prior to being sent to the first node so as to reduce processing and/or storage resources consumed by the second node.

20. A router as recited in claim 19, wherein the first condition is met when a first received data segment includes a field that indicates whether the data segment is important.

21. A router as recited in claim 19, wherein the first condition is met when a data length of at least a portion of the combined data is less than or equal to a window size indicated by the second node, wherein a maximum portion of the combined data that will fit within the indicated window size is sent to the second node.

22. A router as recited in claim 19, wherein data that travels between the first node and the second node has a first maximum data size and data that is traveling between the combiner node and the second node has a second maximum data size, the first maximum size being substantially smaller than the second maximum data size, wherein the combined data segments sent to the second node have an associated size that is less than or equal to the second maximum data size.

23. A router as recited in claim 22, wherein the first and second maximum data size are selected from a group consisting of a first and second window size, a first and second maximum segment size, and a first and second maximum transmission unit.

24. A router as recited in claim 19, wherein the at least one of the processors and memory are further adapted to:
at the router, receiving data from the second node that is destined for the first node;
at the router, splitting the received data into a plurality of segments; and
at the router, sending the segments to the first node,
wherein the received data is segmented in the router prior to being sent to the first node so as to reduce processing and/or storage resources consumed by the second node.

25. A router as recited in claim 19, wherein the first condition is met when a last segment belonging to a same data group that was fragmented is received, wherein the combined data that is sent to the second node includes all of the segments of the same fragmented data group.

26. A router as recited in claim 19, wherein the at least one of the processors and memory are further adapted to:
when out-of-order data segments are received, buffer the received out-of-order data segments with previously buffered data segments from the first node if present until missing data segments are received; and
reorder the out-of-order data segments after missing data segments are received prior to combining the re-ordered data segments with previously buffered data segments.

27. A router as recited in claim 19, wherein the at least one of the processors and memory are further adapted to send the received data segments substantially immediately without the first condition being met to the second node when the received data segments have a relatively high priority.

28. A router as recited in claim 27, wherein the received data segments have a relatively high priority based on information contained in the received data segments.

29. A router as recited in claim 27, wherein the received data segments are combined with previously buffered data segments having a same priority level as the received data segments and the first condition is met when a timer associated with the same priority level expires.

30. A router as recited in claim 29, wherein there are a plurality of timers each associated with a different priority level.

31. A router as recited in claim 19, wherein at least one of the processors and memory are further adapted to:
at the router, establish a second flow between the second node and the router.

32. A router as recited in claim 19, wherein the first condition is met when a combiner timer expires.

33. A router operable to handle data, the router comprising:
one or more processors;
one or more memory, wherein at least one of the processors and memory are adapted to:
at the router, establish a flow between a first node and the router, wherein the established flow comprises a set of Syn, Syn-Ack, Ack, Fin, Fin-Ack and Ack data exchanges;
at the router, receive data segments from the first node that are destined for a second node;
at the router, combine and buffering the received data segments with previously buffered data segments from the first node if present until a first condition is met;
at the router, send at least a portion of the combined data segments to the second node when the first condition is met,
at the router, receiving data from the second node that is destined for the first node;
at the router, splitting the received data into a plurality of segments; and
at the router, sending the segments to the first node,
wherein the received data segments are combined in the router prior to being sent to the second node and wherein the received data is segmented in the router prior to being sent to the first node so as to reduce processing and/or storage resources consumed by the second node.

34. A router as recited in claim 33, wherein the first condition is met when a combiner timer expires, wherein the at least one of the processors and memory are further adapted to:
wait a predetermined amount of time and then determining whether there is congestion between the router and the second node; and
when it is determined that there is congestion, increase or resetting the combiner timer.

35. A router as recited in claim 33, wherein the first condition is met when a combiner timer expires, wherein the at least one of the processors and memory are further adapted to:
when a number of flows received into the router changes, set the combiner timer based on the number of flows.

36. A router as recited in claim 35, wherein the combiner timer is set to a selected one of a plurality of times, wherein each time selection is based on whether the number of flows has reached a particular threshold level.

37. A computer program product comprising a computer readable medium on which is provided program instructions for handling data at a combining device, the program instructions comprising:
instructions for establishing a flow between a first node and the combining device;
instructions for receiving data segments from the first node that are destined for a second node;
instructions for combining and buffering the received data segments with previously buffered data segments from the first node if present until a first condition is met;
instructions for receiving data from the second node that is destined for the first node;
instructions for splitting the received data into a plurality of segments; and
instructions for sending the segments to the first node,
wherein the received data segments are combined in the combining device prior to being sent to the second node and wherein the received data is segmented in the combining device prior to being sent to the first node so as to reduce processing and/or storage resources consumed by the second node.

38. A computer program product as recited in claim 37, wherein the computer readable medium is selected from a group consisting of magnetic media and magneto-optical media.

39. A computer program product as recited in claim 37, wherein computer program instructions stored within the at least one computer readable product configured to cause the combining device to:

at the combining device, establish a second flow between the second node and the combining device.

40. An apparatus for handling data, the apparatus comprising:

means for establishing a flow between a first node and the combiner node;

means for receiving data segments from the first node that are destined for a second node;

means for combining and buffering the received data segments with previously buffered data segments from the first node if present until a first condition is met;

means for sending at least a portion of the combined data segments to the second node when the first condition is met, means for receiving data from the second node that is destined for the first node;

means for splitting the received data into a plurality of segments; and means for sending the segments to the first node, wherein the received data segments are combined in the combiner node prior to being sent to the second node and wherein the received data is segmented in the combiner node prior to being sent to the first node so as to reduce processing and/or storage resources consumed by the second node.

41. An apparatus as recited in claim 40, further comprising:

means for establishing a second flow between the second node and the combiner node.

* * * * *